(12) United States Patent
Zhang et al.

(10) Patent No.: US 11,895,676 B2
(45) Date of Patent: Feb. 6, 2024

(54) RESOURCE SET TRANSMISSION METHOD AND TERMINAL DEVICE

(71) Applicant: GUANGDONG OPPO MOBILE TELECOMMUNICATIONS CORP., LTD., Guangdong (CN)

(72) Inventors: Shichang Zhang, Guangdong (CN); Yi Ding, Guangdong (CN); Huei-Ming Lin, South Yarra (AU); Zhenshan Zhao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/185,229

(22) Filed: Mar. 16, 2023

(65) Prior Publication Data

US 2023/0217470 A1  Jul. 6, 2023

Related U.S. Application Data

(63) Continuation of application No. PCT/CN2020/117915, filed on Sep. 25, 2020.

(51) Int. Cl.
*H04W 72/40* (2023.01)
(52) U.S. Cl.
CPC ................. *H04W 72/40* (2023.01)
(58) Field of Classification Search
CPC .................................................. H04W 72/40
USPC ........................................................ 370/329
See application file for complete search history.

(56) References Cited

U.S. PATENT DOCUMENTS

2018/0206211 A1* 7/2018 Seo .......................... H04W 4/70
2019/0387377 A1* 12/2019 Zhang ................. H04W 52/383

FOREIGN PATENT DOCUMENTS

| CN | 111278108 A | 6/2020 |
| CN | 111565405 A | 8/2020 |
| WO | 2019195138 A | 10/2019 |
| WO | 2020025040 A1 | 2/2020 |
| WO | 2020025042 A1 | 2/2020 |
| WO | 2020091494 A | 5/2020 |

OTHER PUBLICATIONS

3GPP TSG RAN WG1 #102-e—R1-2007412—e-Meeting, Aug. 17-28, 2020—Moderator (LG Electronics)—Summary for AI 8.11.2.2 Feasibility and benefits for mode 2 enhancements (34 pages).

(Continued)

*Primary Examiner* — Angel T Brockman
(74) *Attorney, Agent, or Firm* — PERKINS COIE LLP

(57) ABSTRACT

Provided in the implementations of the present disclosure are a resource set transmission method and a terminal device, which can avoid problems of hidden nodes, exposed nodes, half duplex, etc. avoided during resource selection, and improve the reliability of resource selection. The resource set transmission method includes: a first terminal sending first information, the first information being used for indicating M resource sets, wherein the M resource sets are targeted at one target terminal, or each resource set in the M resource sets is targeted at one or more target terminals, and the resource set is used for determining a candidate transmission resource when the target terminal performs resource selection, and M is a positive integer and M≥1.

20 Claims, 6 Drawing Sheets

(56) References Cited

OTHER PUBLICATIONS

3GPP TSG RAN WG1 #102—R1-2006748—e-Meeting, Aug. 17-28, 2020—NTT DOCOMO, Inc.—Discussion on sidelink resource allocation for reliability and latency enhancements (5 pages).
3GPP TSG RAN WG1 #102-e—R1-2005404—e-Meeting, Aug. 17-28, 2020 - vivo—Discussion on mode 2 enhancements (5 pages).
3GPP TSG RAN WG1 #102-e—R1-2005961—e-Meeting, Aug. 17-28, 2020—ZTE, Sanechips—Inter-UE coordination in mode-2 (3 pages).
3GPP TSG RAN WG1 #102-e—R1-2006171—e-Meeting, Aug. 17-28, 2020—Samsung—On Feasibility and Benefits for Mode2 Enhancements (3 pages).
3GPP TSG RAN WG1 meeting #102—R1-2005692—e-Meeting, Aug. 17-28, 2020—CATT—Discussion on feasibility and benefits for mode 2 enhancements (4 pages).
3GPP TSG RAN WG1 Meeting #102-e—R1-2006829—Aug. 17-28, 2020—Qualcomm Incorporated—Reliability and Latency Enhancements for Mode 2 (10 pages).
3GPP TSG RAN WG1 Meeting #102-e—R1-2005255—E-meeting, Aug. 17-28, 2020—Huawei, HiSilicon—Inter-UE coordination in sidelink resource allocation (9 pages).
3GPP TSG RAN WG1 Meeting #102-e—R1-2005749—e-Meeting, Aug. 17-28, 2020—LG Electronics—Discussion on feasibility and benefits for mode 2 enhancement (9 pages).
3GPP TSG RAN WG1 Meeting #102-E—R1-2005897—e-Meeting, Aug. 17-28, 2020—Intel Corporation—On Feasibility and Benefits of Sidelink Enhancements Targeting Mode 2 Reliability and Latency (7 pages).
3GPP TSG RAN WG1 Meeting #102-e R1-2005537—e-Meeting, Aug. 17-28, 2020—Fraunhofer HHI, Fraunhofer IIS—Resource Allocation Enhancements for Mode 2 (9 pages).
3GPP TSG RAN WG1#102-e—R1-2005501—e-Meeting, Aug. 17-28, 2020—Nokia, Nokia Shanghai Bell—Discussion of sidelink resource allocation mode 2 enhancements (5 pages).
3GPP TSG-RAN WG1 Meeting #102-e—R1-2006445—e-Meeting, Aug. 17-28, 2020—Ericsson—Feasibility and benefits of mode 2 enhancements for inter-UE coordination (7 pages).
International Search Report with English translation dated Jun. 23, 2021 of PCT/CN2020/117915 (4 pages).
Written Opinion with English translation dated Jun. 23, 2021 of PCT/CN2020/117915 (7 pages).
European Search Report for European Application No. 20954627.4 dated Aug. 21, 2023, 13 Pages.
Fraunhofer HHI, Fraunhofer IIS; "Designs for NR V2X Mode 2 Resource Allocation"; R1-1812399; 3GPP TSG RAN WG1 Meeting #95 Spokane, USA, Nov. 12-16, 2018; 10 Pages.
Fujitsu; "Considerations on inter-UE coordination for mode 2 enhancements "; R1-2005546; 3GPP TSG RAN WG1 #102-e e-Meeting, Aug. 17-28, 2020; 11 PAges.
Xiaomi; "Discussion on SCI content for 5G V2X "; R1-2002400; 3GPP TSG RAN WG1 #100bis e-Meeting, Apr. 20-30, 2020; 4 Pages.

* cited by examiner

RESOURCE SET TRANSMISSION METHOD AND TERMINAL DEVICE

CROSS-REFERENCE TO RELATED APPLICATION(S)

The present application is a continuation application of International PCT Application No. PCT/CN2020/117915, filed on Sep. 25, 2020, the entire content of which is hereby incorporated by reference.

TECHNICAL FIELD

Implementations of the present disclosure relate to the communication field, and more particularly, to a method for transmitting a resource set and a terminal device.

BACKGROUND

In a New Radio Vehicle to Everything (NR-V2X) system, a terminal device may randomly select a transmission resource in a resource pool, or a terminal device may select a transmission resource in a resource pool according to a sensing result, and this resource selection mode may avoid interference between terminals to a certain extent. However, this resource selection mode also has some problems, such as hidden node, exposed node, and Half-duplex. How to enhance the above resource selection mode to avoid hidden node, exposed node, half-duplex, and other problems in resource selection is an urgent problem to be solved.

SUMMARY

Implementations of the present disclosure provide a method for transmitting a resource set and a terminal device, which can avoid problems of hidden node, exposed node, half duplex, and the like in resource selection, and improve reliability of resource selection.

In a first aspect, a method for transmitting a resource set is provided and includes: sending, by a first terminal, first information, wherein the first information is used for indicating M resource sets, the M resource sets are targeted on one target terminal, or each resource set in the M resource sets is targeted on one or more target terminals, and the resource set is used for determining a candidate transmission resource when a target terminal selects a resource, M is a positive integer, and M≥1.

In a second aspect, a method for transmitting a resource set is provided and includes: receiving, by a target terminal, first information sent by a first terminal, wherein the first information is used for indicating M resource sets, the M resource sets are targeted on one target terminal, or each resource set in the M resource sets is targeted on one or more target terminals, and the resource set is used for determining a candidate transmission resource when a target terminal selects a resource, M is a positive integer, and M≥1.

In a third aspect, there is provided a terminal device, which is configured to perform the method in the first aspect.

Specifically, the terminal device includes functional modules configured to perform the method in the first aspect.

In a fourth aspect, there is provided a terminal device, which is configured to perform the method in the second aspect.

Specifically, the terminal device includes functional modules configured to perform the method in the second aspect.

In a fifth aspect, there is provided a terminal device including a processor and a memory. The memory is configured to store a computer program, and the processor is configured to call and run the computer program stored in the memory to perform the method in the first aspect.

In a sixth aspect, there is provided a terminal device, which includes a processor and a memory. The memory is configured to store a computer program, and the processor is configured to call and run the computer program stored in the memory to perform the method in the second aspect.

In a seventh aspect, there is provided an apparatus, which is configured to implement the method in any one of the first to second aspects.

Specifically, the apparatus includes a processor, configured to call and run a computer program from a memory, so that a device installed with the apparatus is enabled to perform the method in any one of the first to second aspects.

In an eighth aspect, there is provided a computer-readable storage medium, which is configured to store a computer program that enables a computer to perform the method in any one of the first to second aspects.

In a ninth aspect, there is provided a computer program product, which includes computer program instructions that enable a computer to perform the method in any one of the first to second aspects.

In a tenth aspect, there is provided a computer program. When being run on a computer, the computer program enables the computer to perform the method in any one of the first to second aspects.

With the above technical solutions, a first terminal may indicate M resource sets to a target terminal, the M resource sets may be targeted on one target terminal, or, each resource set in the M resource sets may be targeted on one or more target terminals, thus a resource set may be accurately and effectively indicated to a target terminal, and a candidate transmission resource may be determined according to the indicated resource set when the target terminal selects a resource, thus problems of hidden node, exposed node, half-duplex, and the like can be avoided in resource selection, and reliability of resource selection on a sidelink is improved.

DETAILED DESCRIPTION

Figure 1:
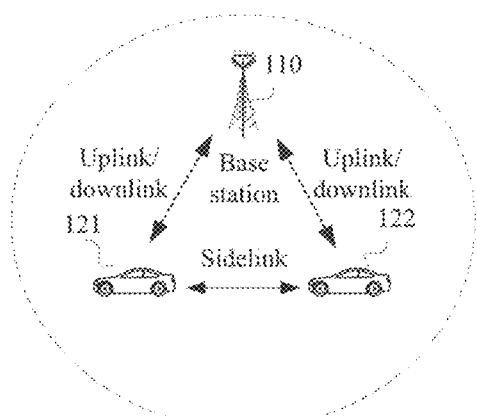
FIG. 1 is a schematic diagram of architecture of a communication system according to an implementation of the present disclosure.

Technical solutions in implementations of the present disclosure will be described below with reference to the drawings in the implementations of the present disclosure. It is apparent that the implementations described are just some of the implementations of the present disclosure, but not all of the implementations of the present disclosure. With regard to the implementations of the present disclosure, all other implementations obtained by a person of ordinary skill in the art without making an inventive effort are within the protection scope of the present disclosure.

Technical solutions according to the implementations of the present disclosure may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio interface (NR) system, an evolution system of an NR system, an LTE-based access to unlicensed spectrum (LTE-U) system, an NR-based access to unlicensed spectrum (NR-U) system, a Non-Terrestrial Networks (NTN) system, a Universal Mobile Telecommunications System (UMTS), Wireless Local Area Networks (WLAN), Wireless Fidelity (WiFi), a 5th-generation (5G) communication system, or another communication system.

Generally, traditional communication systems support a limited quantity of connections, and are easy to implement. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc., and the implementations of the present disclosure may be applied to these communication systems as well.

Optionally, the communication systems in the implementations of the present disclosure may be applied to a Carrier Aggregation (CA) scenario, or a Dual Connectivity (DC) scenario, or a Standalone (SA) network deployment scenario.

Optionally, the communication system in an implementation of the present disclosure may be applied to an unlicensed spectrum, wherein the unlicensed spectrum may also be considered as a shared spectrum; or, the communication system in an implementation of the present disclosure may also be applied to a licensed spectrum, wherein the licensed spectrum may also be considered as a non-shared spectrum.

Various implementations of the present disclosure are described in combination with a network device and a terminal device. The terminal device may also be referred to as a User Equipment (UE), an access terminal, a subscriber unit, a subscriber station, a mobile station, a mobile platform, a remote station, a remote terminal, a mobile device, a user terminal, a terminal, a wireless communication device, a user agent or a user apparatus, etc.

The terminal device may be a STATION (ST) in a WLAN, or may be a cellular phone, a cordless phone, a Session Initiation Protocol (SIP) phone, a Wireless Local Loop (WLL) station, a Personal Digital Assistant (PDA) device, a handheld device with a wireless communication function, a computing device, or another processing device connected to a wireless modem, a vehicle-mounted device, a wearable device, and a terminal device in a next generation communication system, such as an NR network, or a terminal device in a future evolved Public Land Mobile Network (PLMN), etc.

In an implementation of the present disclosure, a terminal device may be deployed on land including indoor or outdoor, handheld, wearable or vehicle-mounted terminal device; or it may be deployed on water (such as on ships, etc.); or it may be deployed aerially (such as in airplanes, balloons and satellites, etc.).

In an implementation of the present disclosure, the terminal device may be a mobile phone, a Pad, a computer with wireless transceiving function, a virtual reality (VR) terminal device, an augmented reality (AR) terminal device, a wireless terminal device in industrial control, a wireless terminal device in self driving, a wireless terminal device in remote medicine, a wireless terminal device in smart grid, a wireless terminal device in transportation safety, a wireless terminal device in smart city, or a wireless terminal device in smart home, etc.

As an example rather than limitation, in the implementations of the present disclosure, the terminal device may be a wearable device. The wearable device may also be referred to as a wearable smart device, which is a general term of wearable devices developed with intelligent design on daily wear by applying wearable technology, such as glasses, gloves, a watch, clothing and shoes. The wearable device is a portable device that is worn directly on a body, or integrated into clothes or accessories of users. The wearable device not only is a hardware device, but also implements powerful functions through software support as well as data interaction or cloud interaction. Generalized wearable smart devices include devices such as a smart watch or smart glasses, which are fully functional, in large sizes, and may implement complete or partial functions without relying on smart phones, and devices such as various smart bracelets, smart jewelries or the like for monitoring physical signs, which focus on a certain kind of application functions only and need to be used in conjunction with other devices such as smart phones.

In the implementations of the present disclosure, the network device may be a device used for communicating with a mobile device, and may be an Access Point (AP) in a WLAN, a Base Transceiver Station (BTS) in GSM or CDMA, a NodeB (NB) in WCDMA, an evolutional Node B (eNB or eNodeB) in LTE, or a relay station or an access point, or a vehicle-mounted device, a wearable device, a network device or a base station (gNB) in an NR network, or a network device in a future evolved PLMN network, or a network device in an NTN network, etc.

As an example rather than limitation, in an implementation of present disclosure, the network device may be of mobility, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may be a base station disposed in a position on land or a water region etc.

In an implementation of the present disclosure, the network device may provide a service for a cell, and the terminal device communicates with the network device through a transmission resource (e.g., a frequency domain resource, which is also referred to as a spectrum resource) used by the cell, wherein the cell may be a cell corresponding to the network device (e.g., a base station), and the cell may belong to a macro base station, or may belong to a base station corresponding to a Small cell. The Small cell herein may include a Metro cell, a Micro cell, a Pico cell, or a Femto cell, etc. The Small cells are characterized by a small coverage range and a low transmission power, and are suitable for providing high-speed data transmission services.

It should be understood that the terms "system" and "network" are often used interchangeably herein. The term "and/or" herein describes an association relationship between associated objects only, indicating that there may be three relationships, for example, A and/or B may indicate three cases: A alone, A and B, and B alone. In addition, the symbol "I" herein generally indicates that there is an "or" relationship between the associated objects before and after "/".

Terminologies used in implementation sections of the present disclosure are only for the purpose of explaining specific implementations of the present disclosure, but are not intended to limit the present disclosure. Terms "first", "second", "third" and "fourth", or the like in the specification, claims and drawings of the present disclosure are used to distinguish different objects but not used to describe a specific order. In addition, terms "include" and "have" and any variations thereof are intended to cover non-exclusive inclusion.

It should be understood that "indication" involved in implementations of the present disclosure may be a direct indication, may be an indirect indication, or may represent an association relationship. For example, that A indicates B may mean that A indicates B directly, for example, B may be acquired through A; or it may mean that A indicates B indirectly, for example, A indicates C, and B may be acquired through C; or it may mean that there is an association between A and B.

In the description of the implementations of the present disclosure, the term "correspond" may mean that there is a directly corresponding or an indirectly corresponding relationship between two parties, or mean that there is an association between two parties, or mean a relationship such as indicating and being indicated, configuring and being configured, etc.

Figure 2:
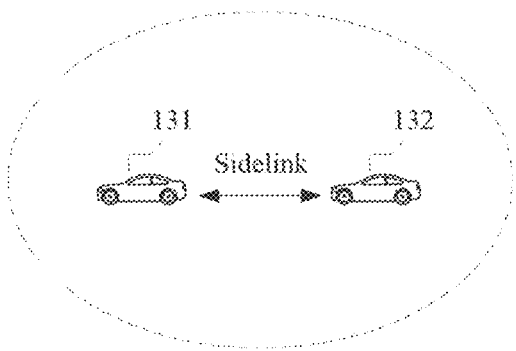
FIG. 2 is a schematic diagram of architecture of another communication system according to an implementation of the present disclosure.

FIG. 1 is a schematic diagram of a first mode according to an implementation of the present disclosure. FIG. 2 is a schematic diagram of a second mode according to an implementation of the present disclosure.

In the first mode shown in FIG. 1, a transmission resource of a Vehicle User Equipment (VUE) (a VUE 121 and a VUE 122) is allocated by a base station 110, and the VUE performs data transmission on a sidelink according to the resource allocated by the base station 110. Specifically, the base station 110 may allocate a resource for single transmission to a terminal, or may allocate a resource for semi-static transmission to a terminal.

In the second mode shown in FIG. 2, a VUE (a VUE 131 and a VUE 132) autonomously selects a transmission resource on a resource of a sidelink for data transmission. Optionally, a VUE may randomly select a transmission resource, or select a transmission resource by means of sensing.

Figure 3:
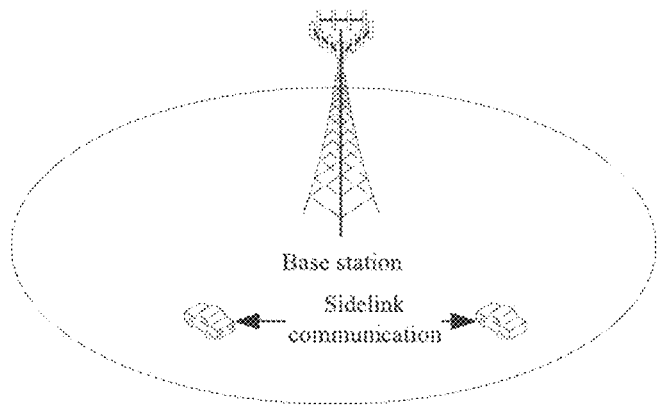
FIG. 3 is a schematic diagram of sidelink communication within a network coverage range according to the present disclosure.
Figure 4:
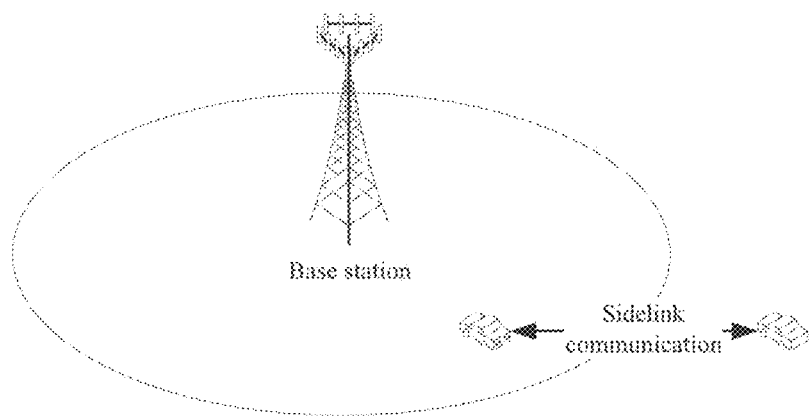
FIG. 4 is a schematic diagram of sidelink communication with partial network coverage according to the present disclosure.
Figure 5:
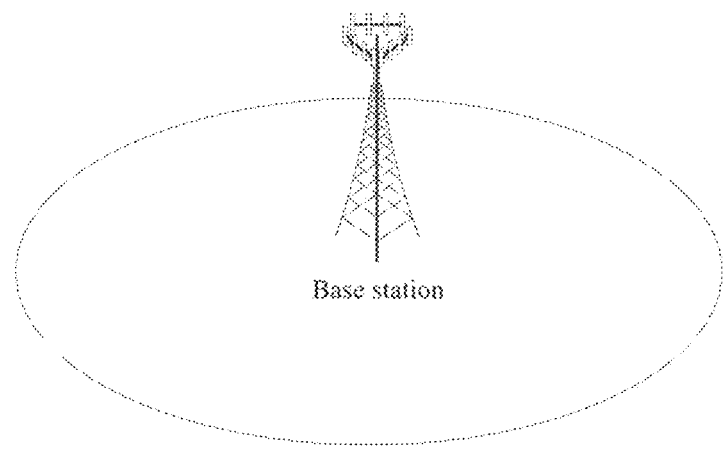
FIG. 5 is a schematic diagram of sidelink communication outside a network coverage range according to the present disclosure.

It should be noted that in sidelink communication, according to a situation of network coverage where a terminal in communication is located, it may be divided into sidelink communication within network coverage as shown in FIG. 3; sidelink communication with partial network coverage as shown in FIG. 4; and sidelink communication outside network coverage as shown in FIG. 5.

In FIG. 3, in sidelink communication within network coverage, all terminals performing sidelink communication are in a coverage range of a same base station, so that all the terminals may perform sidelink communication based on a same sidelink configuration by receiving a configuration signaling of the base station.

In FIG. 4, in a case of sidelink communication with partial network coverage, some terminals performing sidelink communication are located in a coverage range of a base station, and these terminals can receive a configuration signaling of the base station and perform sidelink communication according to a configuration of the base station. However, a terminal located outside a network coverage range cannot receive a configuration signaling of the base station. In this case, the terminal outside the network coverage range determines a sidelink configuration according to pre-configuration information and information carried in a Physical Sidelink Broadcast Channel (PSBCH) sent by a terminal located within the network coverage range, and performs sidelink communication.

In FIG. 5, for sidelink communication outside network coverage, all terminals performing sidelink communication are located outside a network coverage range, and all the terminals determine a sidelink configuration according to pre-configuration information to perform sidelink communication.

It should be noted that Device to Device (D2D) communication is a Sidelink (SL) transmission technology based on Device to Device (D2D), which is different from a way by which communication data is received or sent through a base station in a conventional cellular system, thus it has higher spectrum efficiency and lower transmission latency. In a Vehicle to everything (V2X) system, a manner of Device to Device direct communication is adopted, and two transmission modes are defined in 3GPP, which are respectively noted as a first mode and a second mode. The implementations of the present disclosure may be applied to the second mode.

In the first mode, a transmission resource of a terminal is allocated by a base station. The terminal sends data on a sidelink according to the resource allocated by the base station; and the base station may allocate, to the terminal, a resource for single transmission or a resource for semi-static transmission. As shown in FIG. 2, a terminal is located within network coverage, and a network allocates a transmission resource used for sidelink transmission to the terminal.

In the second mode, a terminal selects one resource in a resource pool for data transmission. As shown in FIG. 4, a terminal is located outside a coverage range of a cell, and the terminal selects a transmission resource autonomously in a pre-configured resource pool for sidelink transmission; or, as shown in FIG. 2, the terminal selects a transmission resource autonomously in a resource pool configured by a network for sidelink transmission.

It should be noted that in NR-V2X, a user may be in a mixed mode, that is, the first mode may be used for acquiring a resource and the second mode may also be used for acquiring a resource at the same time.

In the NR-V2X, automatic driving is supported, thus higher requirements are put forward for data interaction between vehicles, such as higher throughput, lower latency, higher reliability, larger coverage range, and more flexible resource allocation.

Figure 6:
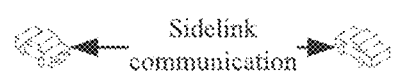
FIG. 6 is a schematic diagram of unicast sidelink communication according to the present disclosure.
Figure 6:
Figure 7:
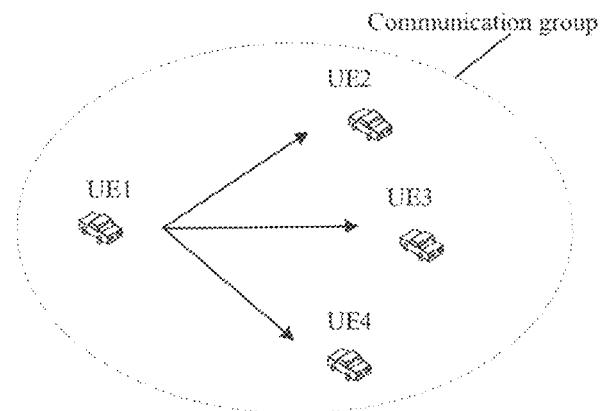
FIG. 7 is a schematic diagram of multicast sidelink communication according to the present disclosure.
Figure 8:
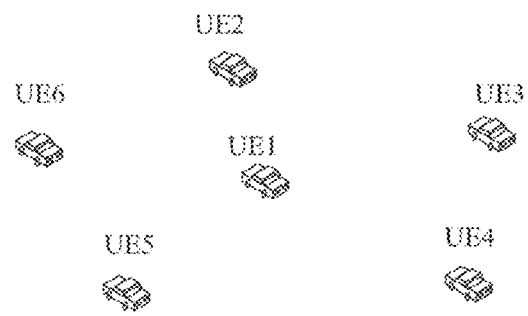
FIG. 8 is a schematic diagram of broadcast sidelink communication according to the present disclosure.

In Long Term Evolution Vehicle to Everything (LTE-V2X), a broadcast transmission mode is supported, and in NR-V2X, unicast and multicast transmission modes are introduced. For unicast transmission, there is only one terminal at a receiving end, as shown in FIG. 6, unicast transmission is carried out between UE1 and UE2. For multicast transmission, the receiving ends are all terminals in a communication group or all terminals within a certain transmission distance, as shown in FIG. 7, UE1, UE2, UE3, and UE4 form a communication group, in which UE1 sends data, and other terminal devices in the group are receiving end terminals. For a broadcast transmission mode, a receiving end is any terminal around a transmitting end terminal, as shown in FIG. 8, UE1 is a transmitting end terminal, and other terminals around it, i.e., UE2-UE6, are all receiving end terminals.

A resource pool is introduced into a sidelink transmission system. The so-called resource pool is a set of transmission resources. No matter transmission resources configured by a network or transmission resources selected by a terminal autonomously, they are all resources in the resource pool. A resource pool may be configured through pre-configuration or network configuration, and one or more resource pools may be configured. A resource pool is divided into a sending resource pool and a receiving resource pool. The sending resource pool is a resource pool that a transmission resource in that resource pool is used for sending sidelink data; the receiving resource pool is a resource pool that a terminal receives sidelink data on a transmission resource in that resource pool.

Figure 9:
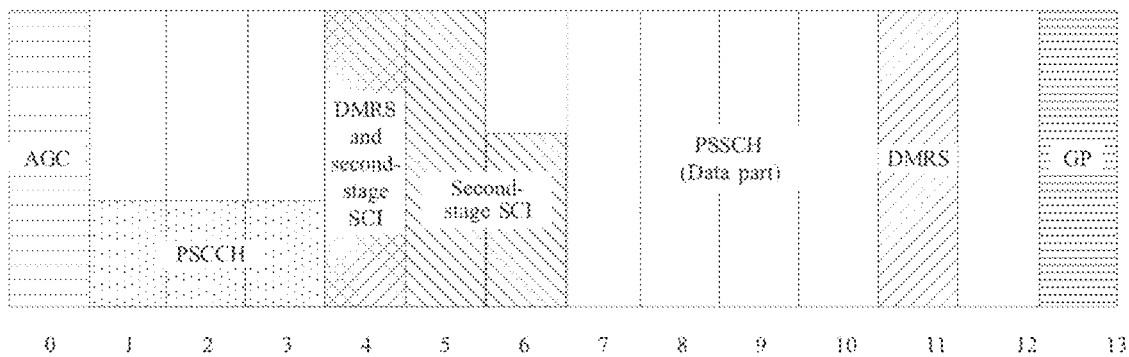
FIG. 9 is a schematic diagram of a Physical Sidelink Control Channel (PSCCH) and Physical Sidelink Shared Channel (PSSCH) frame structure according to the present disclosure.

Second-stage Sidelink Control Information (SCI) is introduced into NR-V2X, and first-stage SCI is carried in a Physical Sidelink Control Channel (PSCCH), and used for indicating a transmission resource, reserved resource information, a Modulation and Coding Scheme (MCS) level, a priority, and the like of a Physical Sidelink Shared Channel (PSSCH). The second-stage SCI is sent in a resource of the PSSCH, and is demodulated using Demodulation Reference Signal (DMRS) of the PSSCH, and is used for indicating information used for data demodulation, such as an Identity (ID) of a sending end (also be referred to as a Source ID), an ID of a receiving end (also be referred to as a Destination ID, a Hybrid Automatic Repeat reQuest (HARM) ID, and a New Data Indicator (NDI). A first symbol is usually used as Auto Gain Control (AGC), the PSCCH starts from a second symbol of a time slot, and a last symbol is used as a Guard Period (GP). The second-stage SCI is mapped from a first DMRS symbol of the PSSCH, firstly mapped in frequency domain and then mapped in time domain. As shown in FIG. 9, the PSCCH occupies three symbols (symbol 1, symbol 2, and symbol 3), the DMRS of the PSSCH occupies symbol 4 and symbol 11, and the second-stage SCI is mapped from symbol 4 and is frequency-division-multiplexed with the DMRS on symbol 4. The second-stage SCI is mapped to symbol 4, symbol 5, and symbol 6. A size of resources occupied by the second-stage SCI depends on the number of bits of the second-stage SCI.

In a transmission mode of the above second mode, a terminal device randomly selects a transmission resource in a resource pool, or selects a transmission resource according to a sensing result. This resource selection mode may avoid interference between terminals to a certain extent, but still has following problems.

Figure 10:
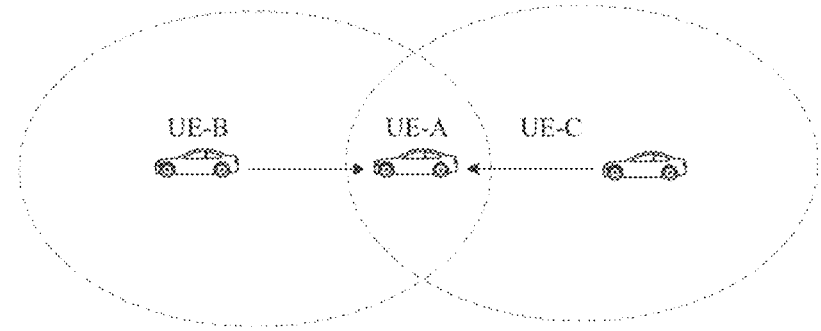
FIG. 10 is a schematic diagram of a hidden node according to the present disclosure.
Figure 11:
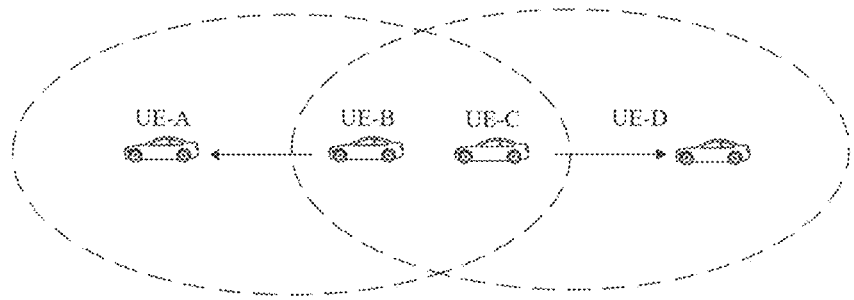
FIG. 11 is a schematic diagram of an exposed node according to the present disclosure.

1. Hidden node: as shown in FIG. 10 below, UE-B selects a resource according to sensing and uses this resource to send sidelink data to UE-A. Since UE-B and UE-C are far away from each other and cannot sense transmission of each other, UE-B and UE-C may select a same transmission resource, then data sent by UE-C will cause interference to data sent by UE-B, which is a hidden node problem.
2. Half-duplex problem: when a terminal selects a transmission resource through sensing, in a sensing window, if the terminal sends sidelink data on a certain time slot, due to a limitation of half-duplex, the terminal cannot receive data sent by another terminal on this time slot and has no sensing result. Therefore, when the terminal performs resource exclusion, it will exclude all resources corresponding to this time slot in a selection window to avoid interference with another terminal. The limitation of half-duplex will cause the terminal to exclude many resources that do not need to be excluded. In addition, since the terminal sends data on the time slot, if another terminal also selects a same resource on the time slot to send data, then both terminals cannot determine existence of resource conflict due to the limitation of half-duplex, which will lead to continuous resource conflict between the two terminals.
3. Terminal exposure problem: as shown in FIG. 11, both a sending terminal UE-B and a sending terminal UE-C may sense each other, but a target receiving terminal UE-A of UE-B is far away from UE-C, a target receiving terminal UE-D of UE-C is far away from UE-B, in this case, even if UE-B and UE-C use a same time-frequency resource, reception of their respective target receiving terminals will not be affected. However, since the two parties are close in geographical positions, it is detected that a signal receiving power of the other party may be very high during a sensing process, so both parties will choose orthogonal video resources, which may eventually lead to decrease of resource utilization efficiency.
4. Power consumption problem: during the above sensing process, a terminal needs to continuously sense resources to determine which resources are available. However, it takes a lot of energy for the terminal to continuously sense resources, which is not a problem for a vehicle-mounted terminal because the vehicle-mounted terminal has a power supply device, but for a handheld terminal, excessive energy consumption will lead to the terminal running out of power soon. Therefore, how to reduce energy consumption of a terminal is also a problem to be considered in a process of resource selection.

Due to the problems existing in the process of resource selection in the second transmission mode, an enhanced resource selection solution is proposed. On a basis of resource sensing used in the second transmission mode, a resource set may also be sent from one terminal (UE-A) to another terminal (UE-B) for assisting the UE-B in resource selection. The resource set may be of following two different types.

Resource set: UE-A may acquire an available resource set according to a resource sensing result, base station indication, etc., and send the resource set to UE-B. The resource set may be a resource set suitable for using by UE-B, and when UE-B selects a resource for sending sidelink data to a target receiving terminal, the resource may be preferentially selected from the available resource set, thereby improving reliability of receiving the sidelink data by the target receiving terminal; or, the resource set may also be a resource set that is not suitable for using by UE-B, and UE-B avoids selecting a resource in the resource set when selecting a resource, thereby avoiding problems of a hidden terminal, a half-duplex limitation, and the like.

An allocated transmission resource: information transmitted by UE-A to UE-B includes a transmission resource directly allocated to UE-B, and UE-B uses the transmission resource to send sidelink data to a target receiving terminal. At this time, it is equivalent to the case that UE-A allocates a sidelink transmission resource to UE-B.

That is to say, in the above resource allocation manner, a terminal device needs to combine a resource set sent by another terminal during a resource selection process, so that transmission reliability may be improved.

However, in the above enhanced resource selection solution, UE-A sends a resource set for UE-B to assist UE-B in resource selection, but how UE-A sends a resource set to UE-B to avoid the above-mentioned half-duplex problem, hidden node, and other problems is a problem that needs to be solved.

Based on the above problems, the present disclosure provides a solution for transmitting a resource set, a resource set can be transmitted, and hidden node, half-duplex, and other problems in resource selection can be avoided, thereby improving reliability of resource selection.

Technical solutions of the present disclosure will be described in detail below with specific implementations.

Figure 12:
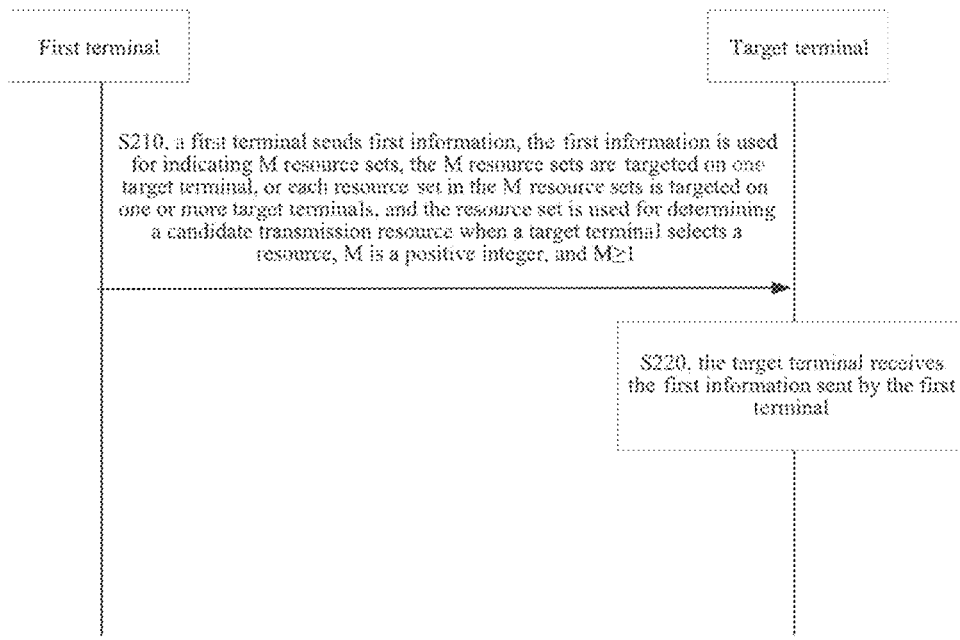
FIG. 12 is a schematic flowchart of a method for transmitting a resource set according to an implementation of the present disclosure.

FIG. 12 is a schematic flowchart of a method for transmitting a resource set 200 according to an implementation of the present disclosure. As shown in FIG. 12, the method 200 may include at least part of following contents.

In S210, a first terminal sends first information, the first information is used for indicating M resource sets, the M resource sets are targeted on one target terminal, or each resource set in the M resource sets is targeted on one or more target terminals, and the resource set is used for determining a candidate transmission resource when a target terminal selects a resource, M is a positive integer, and M≥1.

In S220, the target terminal receives the first information sent by the first terminal.

In an implementation of the present disclosure, the first terminal may send the first information to the target terminal by means of unicast, multicast, broadcast, and the like. When a target terminal selects a resource, a candidate transmission resource may be determined based on a resource set, so as to avoid problems of half-duplex, hidden node, exposed node, power consumption, and so on.

In some implementations, the resource set may be specifically used for determining a resource to be excluded when the target terminal performs resource selection. That is, a transmission resource in that resource set is not recommended to be used by a target terminal, and the transmission resource in the resource set should be avoided to be used when the target terminal performs data transmission. That is to say, the first terminal may send transmission resources that may have a problem of resource conflict, or half-duplex, or hidden node, or exposed node, or power consumption, to the target terminal, so that the target terminal avoids selecting these transmission resources, thereby avoiding problems of half-duplex, hidden node, exposed node, etc.

In some implementations, the resource set may also be specifically used for determining a resource to be considered preferentially when the target terminal performs resource selection. That is, a transmission resource in the resource set is a transmission resource recommended to be used by the target terminal, and when the target terminal performs data transmission, the transmission resource in that resource set should be preferentially used. That is to say, the first terminal may send transmission resources to the target terminal after excluding transmission resources that may have a problem of resource conflict, or half-duplex, or hidden node, or exposed node, or power consumption, so that the target terminal selects these transmission resources preferentially, thereby avoiding problems of half-duplex, hidden node, exposed node, and the like.

In an implementation of the present disclosure, for example, a resource set sent by UE-A to UE-B may include following four different situations.

Situation 1: the resource set is part or all of time-frequency resources within a certain time range in the future, for example, time-frequency resources located within a time range [A, B].

Situation 2: the resource set is part or all of resources already reserved by UE-B through a signaling, such as resources reserved by UE-B through a PSCCH for retransmission of a same Transport Block (TB), or resources for new transmission or retransmission of other new TBs.

Situation 3: the resource set is part or all of resources preselected by UE-B but not yet reserved through a signaling, the number of retransmissions of a TB may be up to 32, and if UE-B supports periodic resource reservation, UE-B may reserve up to 150 periods of resources, while UE-B may only reserve at most two resources for retransmission of a same TB and for transmission of a new TB in a next period in one signaling.

Situation 4: the resource set is part or all of resources that UE-B has ever used, for example, resources that UE-B has used in a past period of time.

In the above four situations, UE-A needs to send the resource set to UE-B within a certain time range [t_a, t_b] after a specific trigger condition is met, for example, UE-A may send information carrying the resource set to UE-B within a specific time range after receiving resource request information from UE-B, or UE-A sends information carrying the resource set to UE-B within a specific time according to a state of a timer, or UE-A sends information carrying the resource set to UE-B when determining that an event which may cause a sidelink reception failure occurs.

Optionally, in some implementations, the first information includes, but is not limited to, at least one of following: a specific bit field carried in a PSCCH, a Radio Resource Control (RRC) signaling carried in a PSSCH, a Media Access Control Element (MAC CE) signaling carried in a PSSCH, and second-stage SCI carried in a PSSCH.

It should be noted that the RRC signaling carried in the PSSCH may be an RRC (PC5-RRC) signaling based on a PC5 interface.

Optionally, the specific bit field includes N reserved bits among reserved bits in SCI format 1-A carried in the PSCCH, N is a positive integer, and N≥1.

Optionally, N is pre-configured or determined by a protocol, or N is configured by a network device.

Optionally, in some implementations, a sending manner of the first information used for indicating the M resource sets is detailed in at least one of examples 1 to 9 below.

Example 1

In a case that the first information is any one of an RRC signaling, a MAC CE signaling, and second-stage SCI carried in a PSSCH and the M resource sets are targeted on one target terminal, the first terminal sends the first information to the one target terminal by unicast, and a target identity field in second-stage SCI carried in the PSSCH is set as an Identity (ID) of the one target terminal.

Among them, the one target terminal may receive the first information based on the target identity field in the second-stage SCI.

In the example 1, it is assumed that the first terminal is UE-A and the one target terminal is UE-B. For example, the first information is an RRC signaling or a MAC CE signaling carried in a PSSCH, and UE-A may send the RRC signaling or the MAC CE signaling to UE-B by unicast. In addition, a target identity field in a second-stage SCI in the PSSCH carrying the RRC signaling or the MAC CE signaling is set as an ID of UE-B. For another example, the first information is second-stage SCI carried in a PSSCH, UE-A may send the second-stage SCI to UE-B by unicast and a target identity field in the second-stage SCI is set as an ID of UE-B.

That is to say, in the example 1, the first terminal may indicate M resource sets by unicast.

Example 2

In a case that the first information is any one of an RRC signaling, a MAC CE signaling, and second-stage SCI carried in a PSSCH and the M resource sets are targeted on one target terminal, the first terminal sends the first information to the one target terminal by broadcast, and the first information is further used for indicating an identity of the one target terminal.

Among them, the one target terminal may receive the first information based on the identity of the one target terminal.

In the example 2, it is assumed that the first terminal is UE-A and the one target terminal is UE-B. For example, UE-A may send an RRC signaling or a MAC CE signaling or second-stage SCI to UE-B by broadcast, and in addition, the RRC signaling or the MAC CE signaling or the second-stage SCI should indicate at least an ID of UE-B in addition to indicating the M resource sets.

That is to say, in the example 2, the first terminal may indicate M resource sets by broadcast.

Example 3

In a case that the first information is any one of an RRC signaling, a MAC CE signaling, and second-stage SCI carried in a PSSCH, M=1, and the resource set is targeted on multiple target terminals, the first terminal sends the first information to the multiple target terminals by multicast, and a target identity field in the second-stage SCI carried in the PSSCH is set as a group identity corresponding to the multiple target terminals.

Among them, the multiple target terminals may receive the first information based on the target identity field in the second-stage SCI.

In the example 3, it is assumed that the first terminal is UE-A, the multiple target terminals are UE-B, UE-C, and UE-D, and a group identity of a terminal group to which UE-B, UE-C, and UE-D belong is Group 1. For example, the first information is an RRC signaling or a MAC CE signaling carried in a PSSCH, and UE-A may send the RRC signaling or the MAC CE signaling to UE-B, UE-C, and UE-D by multicast. In addition, a target identity field in the second-stage SCI in the PSSCH carrying the RRC signaling or the MAC CE signaling is set as Group 1. For another example, the first information is second-stage SCI carried in a PSSCH, and UE-A may send the second-stage SCI to UE-B, UE-C, and UE-D by multicast. In addition, a target identity field in the second-stage SCI is set as Group 1.

In the example 3, M=1, that is, the first information indicates only one resource set and the one resource set is targeted on multiple target terminals, that is to say, a candidate transmission resource may be determined based on the resource set when multiple target terminals perform resource selection.

That is to say, in the example 3, the first terminal may indicate M resource sets by multicast.

Example 4

In a case that the first information is any one of an RRC signaling, a MAC CE signaling, and second-stage SCI carried in a PSSCH, M=1, and the resource set is targeted on multiple target terminals, the first terminal sends the first information to the multiple target terminals by broadcast, and a target identity field in the second-stage SCI carried in the PSSCH is set as an identity corresponding to broadcast, and the first information is further used for indicating identities of the multiple target terminals.

Among them, the multiple target terminals may receive the first information based on the identities of the multiple target terminals.

In the example 4, it is assumed that the first terminal is UE-A and the multiple target terminals are UE-B, UE-C, and UE-D. For example, the first information is an RRC signaling or a MAC CE signaling carried in a PSSCH, UE-A may send the RRC signaling or the MAC CE signaling to UE-B, UE-C, and UE-D by broadcast. In addition, a target identity field in second-stage SCI in the PSSCH carrying the RRC signaling or the MAC CE signaling is set as an identity corresponding to broadcast. The RRC signaling or the MAC CE signaling should indicate at least an ID of UE-B, an ID of UE-C, and an ID of UE-D respectively, in addition to indicating the M resource sets. For another example, the first information is second-stage SCI carried in a PSSCH, and UE-A may send the second-stage SCI to UE-B, UE-C, and UE-D by broadcast. In addition, a target identity field in the second-stage SCI is set as an identity corresponding to broadcast, and the second-stage SCI should at least indicate an ID of UE-B, an ID of UE-C, and an ID of UE-D respectively, in addition to indicating the M resource sets.

In the example 4, M=1, that is, the first information indicates only one resource set and the one resource set is targeted on multiple target terminals, that is to say, a candidate transmission resource may be determined based on the resource set when multiple target terminals perform resource selection.

That is to say, in the example 4, the first terminal may indicate M resource sets by broadcast.

Example 5

In a case that the first information is any one of an RRC signaling, a MAC CE signaling, and second-stage SCI carried in a PSSCH, M≥2, and each resource set in the M resource sets is targeted on one target terminal, the first terminal sends the first information to the M target terminals by broadcast, and a target identity field in the second-stage SCI carried in the PSSCH is set as an identity corresponding to broadcast. The first information is further used for indicating an identity of a target terminal targeted by each resource set in the M resource sets.

Among them, the M target terminals may determine a resource set based on the identity of the target terminal targeted by the each resource set.

Optionally, in the example 5, contents indicated by the first information may be as shown in Table 1.

TABLE 1

| Resource set 0 | ID of a terminal targeted by resource set 0 |
| Resource Set 1 | ID of a terminal targeted by resource set 1 |
| ... | ... |
| Resource set M-1 | ID of a terminal targeted by resource set M-1 |

It should be noted that target terminals targeted by different resource sets may be the same or different, which is not limited in the present disclosure.

That is to say, in the example 5, the first terminal may indicate M resource sets by broadcast.

Example 6

In a case that the first information is any one of an RRC signaling, a MAC CE signaling, and second-stage SCI carried in a PSSCH, M≥2, and each resource set in the M resource sets is targeted on multiple target terminals, the first terminal sends the first information to all target terminals targeted by the M resource sets by broadcast, and a target identity field in the second-stage SCI carried in the PSSCH is set as an identity corresponding to broadcast, and the first information is further used for indicating identities of multiple target terminals targeted by each resource set in the M resource sets.

Among them, all target terminals may determine a resource set based on an identity of a target terminal targeted by the each resource set.

Optionally, in the example 6, it is assumed that each resource set in the M resource sets is targeted on R target terminals, and contents indicated by the first information may be as shown in Table 2.

TABLE 2

| Resource set 0 | ID of terminal #0-0 targeted by resource set 0 |
| | ID of terminal #0-1 targeted by resource set 0 |
| | ... |
| | ID of terminal #0-R-1 targeted by resource set 0 |
| Resource Set 1 | ID of terminal #1-0 targeted by resource set 1 |
| | ID of terminal #1-1 targeted by resource set 1 |
| | ... |

TABLE 2-continued

| | ID of terminal #1-R-1 targeted by resource set 1 |
| ... | ... |
| Resource set M-1 | ID of terminal #M-1-0 targeted by resource set M-1 |
| | ID of terminal #M-1-1 targeted by resource set M-1 |
| | ... |
| | ID of terminal #M-1-R-1 targeted by resource set M-1 |

It should be noted that target terminals targeted by different resource sets may be the same or different, which is not limited in the implementations of the present disclosure.

That is to say, in the example 6, the first terminal may indicate M resource sets by broadcast.

Example 7

In a case that the first information is any one of an RRC signaling, a MAC CE signaling, and second-stage SCI carried in a PSSCH, and a target terminal targeted by each resource set in the M resource sets is unknown to the first terminal, the first terminal sends the first information by broadcast, and a target identity field in the second-stage SCI carried in the PSSCH is set as an identity corresponding to broadcast.

That is to say, in the example 7, the first terminal may indicate M resource sets by broadcast.

Example 8

In a case that the first information is any one of an RRC signaling, a MAC CE signaling, and second-stage SCI carried in a PSSCH, and a target terminal targeted by each resource set in the M resource sets is unknown to the first terminal, the first terminal sends the first information by broadcast, and a target identity field in the second-stage SCI carried in the PSSCH is set as an identity corresponding to broadcast. The first information is further used for indicating an effective distance of each resource set in the M resource sets and geographic position information of the first terminal.

In the example 8, the first information is further used for indicating an effective distance of each resource set in the M resource sets and geographic position information of the first terminal, in this case only a target terminal, when a distance between the target terminal and the first terminal is less than an effective distance, needs to consider the resource set when selecting a resource. That is to say, when a distance between a target terminal and the first terminal is less than an effective distance, the target terminal determines a candidate transmission resource according to a resource set targeted on the target terminal itself in the M resource sets when selecting a resource.

That is to say, in the example 8, the first terminal may indicate M resource sets by broadcast.

In the above examples 1 to 8, a target terminal may determine a sending terminal, i.e. the first terminal, according to a source ID indicated by second-stage SCI in a PSSCH.

Example 9

The first information is a specific bit field carried in a PSCCH, wherein the specific bit field includes N reserved bits among reserved bits in SCI format 1-A carried in a PSCCH, N is a positive integer, and N≥1. That is, in the example 9, the N reserved bits are used for indicating M resource sets.

It should be noted that the number of reserved bits in the SCI format 1-A may be pre-configured or determined by a protocol, or the number of reserved bits in SCI format 1-A may be configured by a network device. For example, the number of reserved bits in SCI format 1-A is 2 to 4.

Optionally, N is pre-configured or determined by a protocol, or N is configured by a network device.

Optionally, the N reserved bits are part or all of reserved bits in the SCI format 1-A.

Optionally, in the example 9, the M resource sets are targeted on one target terminal in second-stage SCI associated with the PSCCH (for example, in a case that a first terminal sends first information by unicast), or the M resource sets are targeted on a group of target terminals in second-stage SCI associated with the PSCCH (for example, in a case that a first terminal sends first information by multicast).

Figure 13:
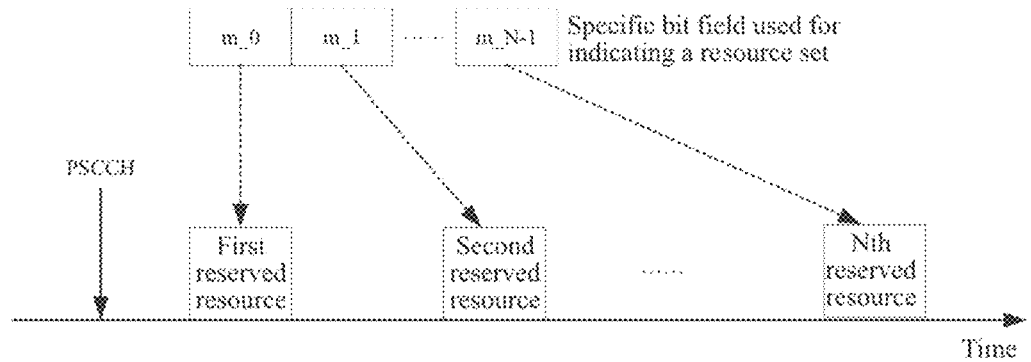
FIG. 13 is a schematic diagram of a correspondence between a specific bit field and a reserved resource according to an implementation of the present disclosure.

Optionally, in the example 9, the first information is further used for instructing a target terminal to re-select an (i+1)th reserved resource after receiving the PSCCH when an ith reserved bit in the N reserved bits is of a first value, as shown in FIG. 13, wherein the N reserved bits are counted from 0, the reserved resources are counted from 1, 0≤i<N. For example, the first value is 1.

Optionally, in the example 9, the first information is further used for instructing a target terminal to reselect all reserved resources when N=1 and a reserved bit is of a first value. For example, the first value is 1.

Optionally, in an implementation of the present disclosure, when the target terminal selects a resource, it determines a candidate transmission resource according to a resource set targeted on the target terminal itself in the M resource sets.

Optionally, in some implementations, the first terminal sends a physical sidelink channel carrying the first information on a target sidelink resource within a sending window, wherein the physical sidelink channel is a PSCCH or a PSSCH. Correspondingly, the target terminal receives a physical sidelink channel carrying the first information sent by the first terminal on a target sidelink resource within a sending window, wherein the physical sidelink channel is a PSCCH or a PSSCH.

It should be noted that, assuming that a first terminal is UE-A and a target terminal is UE-B, if first information is carried through a PSSCH, UE-A may send the PSSCH carrying the first information to UE-B by unicast; or, UE-A may send the PSSCH carrying the first information to multiple terminals including UE-B by multicast; or, UE-A may send the PSSCH carrying the first information to multiple terminals including UE-B by broadcast. For example, when a resource contained in a resource set is a resource selected by UE-A for transmission of a same TB or different TBs, UE-A may send to multiple terminals by multicast or broadcast, and a sending terminal targeted at UE-A may avoid selecting a sending resource in a time slot where the resource in the resource set is located, thus avoiding causing a half-duplex problem. For another example, if a resource contained in a resource set is an available or unavailable resource suggested by UE-A to UE-B, UE-A should send the resource set to UE-B by unicast.

In some implementations, the first terminal works in a second mode: when the first terminal has reserved resources within the sending window, the first terminal determines the target sidelink resource from the reserved resources; or, when the first terminal has no reserved resource within the sending window, the first terminal determines the target sidelink resource through resource reselection.

For example, assuming that the first terminal is UE-A, if UE-A has reserved resources in a sending window [Ta, Tb], the reserved resources includes a resource indicated by UE-A to be reserved through a signaling or a resource that has been selected but not indicated to be reserved through a signaling, it is preferable that UE-A determines the target sidelink resource from the reserved resources.

For another example, assuming that the first terminal is UE-A, if UE-A has no reserved resource in a sending window [Ta, Tb], the reserved resource includes a resource indicated by UE-A to be reserved through a signaling or a resource that has been selected but not indicated to be reserved through a signaling, it is preferable that UE-A should trigger resource reselection in the second mode at Ta−T_proc. Among them, Ta is a starting point of a sending window, a value of T_proc is selected by UE-A in a range of [0, T_cap], and a value of T_cap is related to a Sub-Carrier Space of a current sidelink Band Width Part (BWP), as shown in Table 3. After resource reselection is triggered, a resource selection window should be determined as [Ta, Tb]. When selecting a resource in the second mode, UE-A needs to determine a first threshold according to a first priority and a priority carried in a sensed PSCCH.

Optionally, resource reselection may be specifically: performing, by the first terminal device, resource sensing; and when a sidelink Reference Signal Received Power (RSRP) of a sensed sidelink resource does not exceed a first threshold, the first terminal determines the sensed sidelink resource as the target sidelink resource.

TABLE 3

| Sub-Carrier Space | T_cap [slot] |
| --- | --- |
| 15 kHz | 3 |
| 30 kHz | 5 |
| 60 kHz | 9 |
| 120 kHz | 17 |

Optionally, the first threshold is determined based on a first priority and a priority carried in a sensed PSCCH.

Optionally, the first priority may be acquired in following ways: the first priority is pre-configured or determined by a protocol, or the first priority is configured by a network device; or, the first priority is determined according to an indication of a PSCCH sent by a target terminal; or, the first priority is determined according to a resource type in the M resource sets.

Assuming that a first terminal is UE-A and a target terminal is UE-B, the first priority is determined by UE-A according to an indication of a PSCCH sent by UE-B. For example, a value of the first priority may be equal to a priority indicated in a PSCCH of UE-B last received by UE-A, or if a resource set to be sent by UE-A includes one or more resources reserved by UE-B through one or more PSCCHs that have been sent, the first priority is equal to a highest priority indicated in the above one or more PSCCHs.

Assuming that a first terminal is UE-A and a target terminal is UE-B, the first priority is determined according to a resource type in the M resource sets. For example, a value of the first priority is a if a resource set includes a resource that may have a half-duplex problem between UE-A and UE-B, and a value of the first priority is b if a resource set includes a resource reserved by UE-B with a hidden node interference, wherein a<b, and values of a and b may be configured by a base station, pre-configured, or defined by a standard.

Optionally, the reserved resource includes, but is not limited to, at least one of following: a resource indicated by the first terminal to be reserved through a signaling, and a resource that has been selected but not yet indicated to be reserved through a signaling by the first terminal.

In some implementations, if a resource set is indicated through a specific bit field in a PSCCH, and then if the first terminal has no reserved resource within a sending window [Ta, Tb], and the reserved resource includes a resource indicated by the first terminal to be reserved through a signaling or a resource that has been selected but not yet indicated to be reserved through a signaling by the first terminal, then optionally, a first terminal abandons transmission of the resource set.

In some implementations, the first terminal works in a first mode: when the first terminal has sidelink resources authorized by a network device within the sending window, the first terminal determines the target sidelink resource from the authorized sidelink resources; or, when the first terminal does not have a sidelink resource authorized by a network device within the sending window, the first terminal determines the target sidelink resource by triggering the network device to allocate sidelink resources within the sending window.

For example, assuming that a first terminal is UE-A, if UE-A has sidelink transmission resources allocated by a base station in a sending window [Ta, Tb], it is preferable that UE-A determines the target sidelink resource from the sidelink transmission resources.

For another example, assuming that a first terminal is UE-A, if UE-A has no sidelink transmission resource allocated by a base station in a sending window [Ta, Tb], it is preferable that UE-A should trigger a Scheduling Request (SR) and a Buffer Status Report (BSR) reporting process to apply for sidelink transmission resources to the base station, and UE-A may send values of Ta and Tb through a BSR or another uplink signaling to assist the base station in allocating sidelink transmission resources within an effective time.

In some implementations, if a resource set is indicated through a specific bit field in a PSCCH, and then if the first terminal does not have a sidelink transmission resource allocated by a base station within a sending window [Ta, Tb], then optionally, the first terminal abandons transmission of the resource set.

Optionally, in some implementations, when M=1, the sending window is the same as a sending time range corresponding to the M resource sets; or, when M≥2, the sending window is an intersection of sending time ranges corresponding to the M resource sets.

A way for determining a sending time range corresponding to a resource set is not limited in the present disclosure. For example, a first terminal may determine the time range according to an indication of a target terminal, or determine the time range through a series of pieces of configuration or pre-configuration information, etc.

It should be noted that in an implementation of the present disclosure, a resource pool used by a first terminal for sending a resource set may be the same as or different from a sending resource pool of a target terminal.

Therefore, in an implementation of the present disclosure, a first terminal may indicate M resource sets to a target terminal, the M resource sets may be targeted on one target terminal, or, each resource set in the M resource sets may be targeted on one or more target terminals, thus a resource set may be accurately and effectively indicated to a target terminal, and a candidate transmission resource may be determined according to the indicated resource set when the target terminal selects a resource, thus problems of hidden node, exposed node, half-duplex, and the like can be avoided in resource selection, and reliability of resource selection on a sidelink is improved.

Further, the first terminal may indicate one or more resource sets to a target terminal through a specific bit field carried in a PSCCH, an RRC signaling carried in a PSSCH, a MAC CE signaling carried in a PSSCH, second-stage SCI carried in a PSSCH, and the like, and one resource set may be targeted on one or more target terminals. When the first terminal works in a second mode, it needs to use an existing resource or a re-selected resource to send information for indicating M resource sets within a sending window. When the first terminal works in a first mode, it needs to use existing sidelink authorization or newly applied sidelink authorization within a sending window to send information for indicating M resource sets. Through the method provided by the present disclosure, an accurate and effective indication for a resource set may be achieved, thereby improving effectiveness of resource selection on a sidelink.

Method implementations of the present disclosure are described in detail above in combination with FIGS. 12 to 13, and apparatus implementations of the present disclosure will be described in detail below in combination with FIGS. 14 to 18. It should be understood that the apparatus implementations and the method implementations correspond to each other, and similar descriptions may refer to the method implementations.

Figure 14:
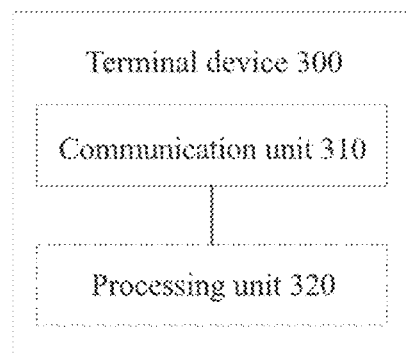
FIG. 14 is a schematic block diagram of a terminal device according to an implementation of the present disclosure.

FIG. 14 shows a schematic block diagram of a terminal device 300 according to an implementation of the present disclosure. As shown in FIG. 14, the terminal device 300 is a first terminal, and the terminal device 300 includes: a communication unit 310, configured to send first information, the first information is used for indicating M resource sets, the M resource sets are targeted on one target terminal, or each resource set in the M resource sets is targeted on one or more target terminals, and the resource set is used for determining a candidate transmission resource when a target terminal selects a resource, M is a positive integer, and M≥1.

Optionally, the first information includes at least one piece of following information: a specific bit field carried in a Physical Sidelink Control Channel (PSCCH), a Radio Resource Control (RRC) signaling carried in a Physical Sidelink Shared Channel (PSSCH), a Media Access Control Element (MAC CE) signaling carried in a PSSCH, and second-stage Sidelink Control Information (SCI) carried in a PSSCH.

Optionally, the specific bit field includes N reserved bits among reserved bits in SCI format 1-A carried in a PSCCH, N is a positive integer, and N≥1.

Optionally, N is pre-configured or determined by a protocol, or N is configured by a network device.

Optionally, the M resource sets are targeted on one target terminal in second-stage SCI associated with the PSCCH, or the M resource sets are targeted on a group of target terminals in second-stage SCI associated with the PSCCH.

Optionally, the first information is further used for instructing a target terminal to re-select an (i+1)th reserved resource after receiving the PSCCH when an ith reserved bit in the N reserved bits is of a first value, wherein the N reserved bits are counted from 0, the reserved resources are counted from 1.

Optionally, the first information is further used for instructing a target terminal to reselect all reserved resources when N=1 and a reserved bit is of a first value.

Optionally, the first value is 1.

Optionally, the communication unit 310 is specifically configured to: in a case that the first information is any one of an RRC signaling, a MAC CE signaling, and second-stage SCI carried in a PSSCH, and the M resource sets are targeted on one target terminal, send the first information to the one target terminal by unicast, wherein a target identity field in the second-stage SCI carried in the PSSCH is set as an identity of the one target terminal; or, send the first information to the one target terminal by broadcast, wherein the first information is further used for indicating an identity of the one target terminal.

Optionally, the communication unit 310 is specifically configured to: in a case that the first information is any one of an RRC signaling, a MAC CE signaling, and second-stage SCI carried in a PSSCH, M=1, and the resource set is targeted on multiple target terminals, send the first information to the multiple target terminals by multicast, wherein a target identity field in the second-stage SCI carried in the PSSCH is set as a group identity corresponding to the multiple target terminals; or send the first information to the multiple target terminals by broadcast, wherein a target identity field in the second-stage SCI carried in the PSSCH is set as an identity corresponding to broadcast, and the first information is further used for indicating identities of the multiple target terminals.

Optionally, the communication unit 310 is specifically configured to: in a case that the first information is any one of an RRC signaling, a MAC CE signaling, and second-stage SCI carried in a PSSCH, M≥2, and each resource set in the M resource sets is targeted on one target terminal, send the first information to M target terminals by broadcast, wherein a target identity field in the second-stage SCI carried in the PSSCH is set as an identity corresponding to broadcast, and the first information is further used for indicating an identity of a target terminal targeted by each resource set in the M resource sets.

Optionally, the communication unit 310 is specifically configured to: in a case that the first information is any one of an RRC signaling, a MAC CE signaling, and second-stage SCI carried in a PSSCH, M≥2, and each resource set in the M resource sets is targeted on multiple target terminals, send the first information to all target terminals targeted by the M resource sets by broadcast, wherein a target identity field in the second-stage SCI carried in the PSSCH is set as an identity corresponding to broadcast, and the first information is further used for indicating identities of multiple target terminals targeted by each resource set in the M resource sets.

Optionally, the communication unit 310 is specifically configured to: in a case that the first information is any one of an RRC signaling, a MAC CE signaling, and second-stage SCI carried in a PSSCH, and a target terminal targeted by each resource set in the M resource sets is unknown to the first terminal, send the first information by broadcast, wherein a target identity field in the second-stage SCI carried in the PSSCH is set as an identity corresponding to broadcast; or, send the first information by broadcast, wherein a target identity field in the second-stage SCI carried in the PSSCH is set as an identity corresponding to broadcast, and the first information is further used for indicating an effective distance of each resource set in the M resource sets and geographic position information of the first terminal.

Optionally, the communication unit 310 is specifically configured to: send a physical sidelink channel carrying the first information on a target sidelink resource within a sending window, wherein the physical sidelink channel is a PSCCH or a PSSCH.

Optionally, the terminal device 300 further includes a processing unit 320, wherein when the first terminal has reserved resources within the sending window, the processing unit 320 is configured to determine the target sidelink resource from the reserved resources; or, when the first terminal does not have a reserved resource within the sending window, the processing unit 320 is configured to determine the target sidelink resource through resource reselection.

Optionally, the processing unit 320 is specifically configured to: perform resource sensing; determine a sensed sidelink resource as the target sidelink resource when a sidelink Reference Signal Received Power (RSRP) of the sensed sidelink resource does not exceed a first threshold, wherein the first threshold is determined according to a first priority and a priority carried in a sensed PSCCH.

Optionally, the first priority is pre-configured or determined by a protocol, or the first priority is configured by a network device; or, the first priority is determined according to an indication of a PSCCH sent by a target terminal; or, the first priority is determined according to a resource type in the M resource sets.

Optionally, the reserved resource includes at least one of following: a resource indicated by the first terminal to be reserved through a signaling, and a resource that has been selected, but not yet indicated to be reserved through a signaling, by the first terminal.

Optionally, the terminal device 300 further includes a processing unit 320, wherein when the first terminal has sidelink resources authorized by a network device within the sending window, the processing unit 320 is configured to determine the target sidelink resource from the authorized sidelink resources; or, when the first terminal does not have a sidelink resource authorized by a network device within the sending window, the processing unit 320 is configured to determine the target sidelink resource by triggering the network device to allocate sidelink resources within the sending window.

Optionally, when M=1, the sending window is the same as a sending time range corresponding to the M resource sets; or, when M≥2, the sending window is an intersection of sending time ranges corresponding to the M resource sets.

Optionally, in some implementations, the communication unit may be a communication interface or a transceiver, or an input/output interface of a communication chip or a system on a chip. The processing unit may be one or more processors.

It should be understood that the terminal device 300 according to the implementations of the present disclosure may correspond to the terminal device in the method implementations of the present disclosure, and the above-mentioned and other operations and/or functions of various units in the terminal device 300 are respectively for implementing corresponding processes of the first terminal in the method 200 shown in FIG. 12, which will not be repeated here for brevity.

Figure 15:
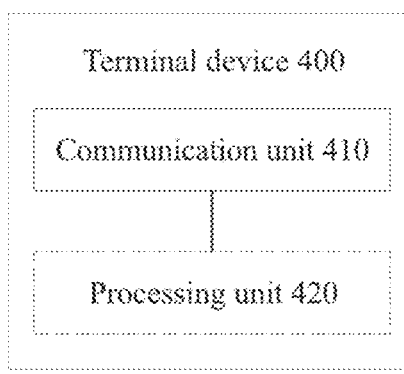
FIG. 15 is a schematic block diagram of a terminal device according to an implementation of the present disclosure.

FIG. 15 shows a schematic block diagram of a terminal device 400 according to an implementation of the present disclosure. As shown in FIG. 15, the terminal device 400 is a target terminal, and the terminal device 400 includes: a communication unit 410, configured to receive first information sent by a first terminal, wherein the first information is used for indicating M resource sets, the M resource sets are targeted on one target terminal, or each resource set in the M resource sets is targeted on one or more target terminals, and the resource set is used for determining a candidate transmission resource when a target terminal selects a resource, M is a positive integer, and M≥1.

Optionally, the first information includes at least one piece of the following information: a specific bit field carried in a Physical Sidelink Control Channel (PSCCH), a Radio Resource Control (RRC) signaling carried in a Physical Sidelink Shared Channel (PSSCH), a Media Access Control Element (MAC CE) signaling carried in a PSSCH, and second-stage Sidelink Control Information (SCI) carried in a PSSCH.

Optionally, the specific bit field includes N reserved bits among reserved bits in SCI format 1-A carried in a PSCCH, N is a positive integer, and N≥1.

Optionally, N is pre-configured or determined by a protocol, or N is configured by a network device.

Optionally, the M resource sets are targeted on one target terminal in second-stage SCI associated with the PSCCH, or the M resource sets are targeted on a group of target terminals in second-stage SCI associated with the PSCCH.

Optionally, the first information is further used for instructing a target terminal to re-select an (i+1)th reserved resource after receiving the PSCCH when an ith reserved bit in the N reserved bits is of a first value, wherein the N reserved bits are counted from 0, the reserved resources are counted from 1.

Optionally, the first information is further used for instructing a target terminal to reselect all reserved resources when N=1 and a reserved bit is of a first value.

Optionally, the first value is 1.

Optionally, the communication unit 410 is specifically configured to: in a case that the first information is any one of an RRC signaling, a MAC CE signaling, and second-stage SCI carried in a PSSCH, and the M resource sets are targeted on one target terminal, receive the first information sent by the first terminal by unicast, wherein a target identity field in the second-stage SCI carried in the PSSCH is set as an identity of the one target terminal; or, receive the first information sent by the first terminal by broadcast, wherein the first information is further used for indicating an identity of the one target terminal.

Optionally, the communication unit 410 is specifically configured to: in a case that the first information is any one of a RRC signaling, a MAC CE signaling, and second-stage SCI carried in a PSSCH, M=1, and the resource set is targeted on multiple target terminals, receive the first information sent by the first terminal by multicast, wherein a target identity field in the second-stage SCI carried in the PSSCH is set as a group identity corresponding to the multiple target terminals; or, receive the first information sent by the first terminal by broadcast, wherein a target identity field in the second-stage SCI carried in the PSSCH is set as an identity corresponding to broadcast, and the first information is further used for indicating identities of the multiple target terminals.

Optionally, the communication unit 410 is specifically configured to: in a case that the first information is any one of an RRC signaling, a MAC CE signaling, and second-stage SCI carried in a PSSCH, M≥2, and each resource set in the M resource sets is targeted on one target terminal, receive the first information sent by the first terminal by broadcast, wherein a target identity field in the second-stage SCI carried in the PSSCH is set as an identity corresponding to broadcast, and the first information is further used for indicating an identity of a target terminal targeted by each resource set in the M resource sets.

Optionally, the communication unit 410 is specifically configured to: in a case that the first information is any one of an RRC signaling, a MAC CE signaling, and second-stage SCI carried in a PSSCH, M≥2, and each resource set in the M resource sets is targeted on multiple target terminals, receive the first information sent by the first terminal by broadcast, wherein a target identity field in the second-stage SCI carried in the PSSCH is set as an identity corresponding to broadcast, and the first information is further used for indicating identities of multiple target terminals targeted by each resource set in the M resource sets.

Optionally, the communication unit 410 is specifically configured to: in a case that the first information is any one of an RRC signaling, a MAC CE signaling, and second-stage SCI carried in a PSSCH, and a target terminal targeted by each resource set in the M resource sets is unknown to the first terminal, receive the first information sent by the first terminal by broadcast, wherein a target identity field in the second-stage SCI carried in the PSSCH is set as an identity corresponding to broadcast; or, receive the first information sent by the first terminal by broadcast, wherein a target identity field in the second-stage SCI carried in the PSSCH is set as an identity corresponding to broadcast, and the first information is further used for indicating an effective distance of each resource set in the M resource sets and geographic position information of the first terminal.

Optionally, the terminal device 400 further includes a processing unit 420, wherein in a case that the first information is further used for indicating an effective distance of each resource set in the M resource sets and geographic position information of the first terminal, and a distance between the target terminal and the first terminal is less than the effective distance, the processing unit 420 is configured to determine a candidate transmission resource according to a resource set targeted on the target terminal itself in the M resource sets when performing resource selection.

Optionally, the terminal device 400 further includes: a processing unit 420, configured to determine a candidate transmission resource according to a resource set targeted on the target terminal itself in the M resource sets when performing resource selection.

Optionally, the communication unit 410 is specifically configured to: receive a physical sidelink channel carrying the first information sent by the first terminal on a target sidelink resource within a sending window, wherein the physical sidelink channel is a PSCCH or a PSSCH.

Optionally, when the first terminal has reserved resources within the sending window, the target sidelink resource is determined by the first terminal from the reserved resources; or, when the first terminal does not have a reserved resource within the sending window, the target sidelink resource is determined by the first terminal through resource reselection.

Optionally, the reserved resource includes at least one of following: a resource indicated by the first terminal to be reserved through a signaling, and a resource that has been selected, but not yet indicated to be reserved through a signaling, by the first terminal.

Optionally, when the first terminal has sidelink resources authorized by a network device within the sending window, the target sidelink resource is determined by the first terminal from the authorized sidelink resources; or, when the first terminal does not have a sidelink resource authorized by a network device within the sending window, the target sidelink resource is determined by the first terminal by triggering the network device to allocate sidelink resources within the sending window.

Optionally, when M=1, the sending window is the same as a sending time range corresponding to the M resource sets; or, when M≥2, the sending window is an intersection of sending time ranges corresponding to the M resource sets.

Optionally, in some implementations, the communication unit may be a communication interface or a transceiver, or an input/output interface of a communication chip or a system on a chip. The processing unit may be one or more processors.

It should be understood that the terminal device 400 according to an implementation of the present disclosure may correspond to the target terminal in the method implementations of the present disclosure, and the above-mentioned and other operations and/or functions of various units in the terminal device 400 are respectively for implementing corresponding processes of the target terminal in the method 200 shown in FIG. 12, which will not be repeated here for brevity.

Figure 16:
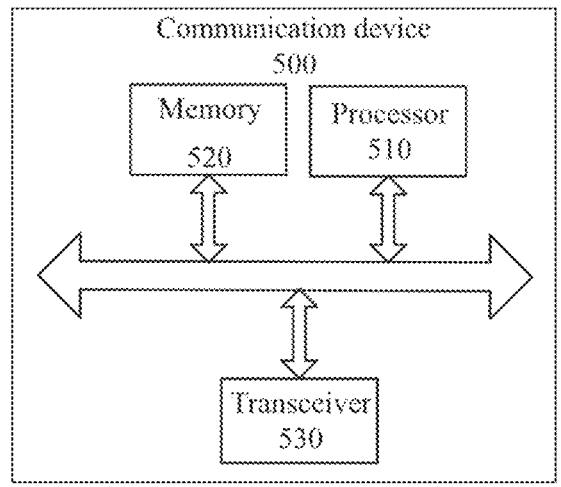
FIG. 16 is a schematic block diagram of a communication device according to an implementation of the present disclosure.

FIG. 16 is a schematic diagram of a structure of a communication device 500 according to an implementation of the present disclosure. The communication device 500 shown in FIG. 16 includes a processor 510, which may call and run a computer program from a memory to implement the methods in the implementations of the present disclosure.

Optionally, as shown in FIG. 16, the terminal device 500 may further include a memory 520. The processor 510 may call and run a computer program from the memory 520 to implement the method in the implementations of the present disclosure.

The memory 520 may be a separate device independent of the processor 510 or may be integrated in the processor 510.

Optionally, as shown in FIG. 16, the communication device 500 may further include a transceiver 530, and the processor 510 may control the transceiver 530 to communicate with other devices. Specifically, the transceiver 1130 may send information or data to other devices or receive information or data sent by other devices.

The transceiver 530 may include a transmitter and a receiver. The transceiver 530 may further include antennas, the number of which may be one or more.

Optionally, the communication device 500 may be specifically the first terminal according to the implementations of the present disclosure, and the communication device 500 may implement corresponding processes implemented by the first terminal in various methods of the implementations of the present disclosure, which will not be repeated here for brevity.

Optionally, the communication device 500 may be specifically the target terminal of the implementations of the present disclosure, and the communication device 500 may implement corresponding processes implemented by the target terminal in the various methods of the implementations of the present disclosure, which will not be repeated here for brevity.

Figure 17:
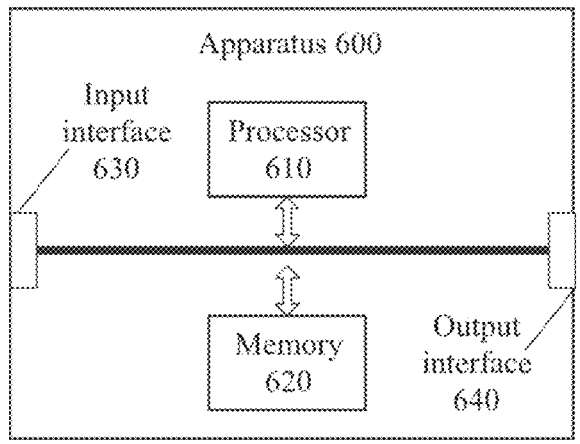
FIG. 17 is a schematic block diagram of an apparatus according to an implementation of the present disclosure.

FIG. 17 is a schematic diagram of a structure of an apparatus according to an implementation of the present disclosure. The apparatus 600 shown in FIG. 17 includes a processor 610. The processor 610 may call and run a computer program from a memory to implement the methods in the implementations of the present disclosure.

Optionally, as shown in FIG. 17, the apparatus 600 may further include a memory 620. The processor 610 may call and run a computer program from the memory 620 to implement the method in the implementations of the present disclosure.

The memory 620 may be a separate device independent of the processor 610 or may be integrated in the processor 610.

Optionally, the apparatus 600 may further include an input interface 630. The processor 610 may control the input interface 630 to communicate with other devices or chips, and specifically, may acquire information or data sent by other devices or chips.

Optionally, the apparatus 600 may further include an output interface 640. The processor 610 may control the output interface 640 to communicate with other devices or chips, and specifically, may output information or data to other devices or chips.

Optionally, the apparatus may be applied in the first terminal in the implementations of the present disclosure, and the apparatus may implement corresponding processes implemented by the first terminal in various methods of the implementations of the present disclosure, which will not be repeated here for brevity.

Optionally, the apparatus may be applied in the target terminal in the implementations of the present disclosure, and the apparatus may implement corresponding processes implemented by the target terminal in the various methods of the implementations of the present disclosure, which will not be repeated here for brevity.

Optionally, the apparatus mentioned in an implementation of the present disclosure may also be a chip. For example, it may be a system-level chip, a system chip, a chip system, or a system on chip, etc.

Figure 18:
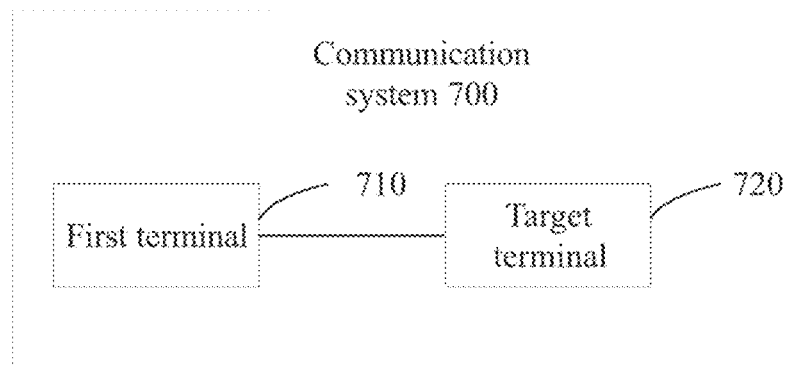
FIG. 18 is a schematic block diagram of a communication system according to an implementation of the present disclosure.

FIG. 18 is a schematic block diagram of a communication system 700 according to an implementation of the present disclosure. As shown in FIG. 18, the communication system 700 includes a first terminal 710 and a target terminal 720.

The first terminal 710 may be configured to implement corresponding functions implemented by the first terminal in the above-mentioned methods, and the target terminal 720 may be configured to implement corresponding functions implemented by the target terminal in the above-mentioned methods, which will not be repeated here for brevity.

It should be understood that the processor in an implementation of the present disclosure may be an integrated circuit chip having a signal processing capability. In an implementation process, the acts of the method implementation described above may be accomplished through an integrated logic circuit of hardware in the processor or instructions in a form of software. The above processor may be a general purpose processor, a Digital Signal Processor (DSP), an Application Specific Integrated Circuit (ASIC), a Field Programmable Gate Array (FPGA), or another programmable logic device, a discrete gate or transistor logic device, or a discrete hardware component. The processor may implement various methods, acts, and logic block diagrams disclosed in the implementations of the present disclosure. The general purpose processor may be a microprocessor, or the processor may be any conventional processor, or the like. The acts of the methods disclosed in the implementations of the present disclosure may be directly embodied as execution by a hardware decoding processor, or execution by a combination of hardware and software modules in the decoding processor. The software modules may be located in a storage medium which is mature in the art, such as a random access memory, a flash memory, a read-only memory, a programmable read-only memory, an electrically erasable programmable memory, or a register. The storage medium is located in the memory, and the processor reads information in the memory and completes the acts of the above method in combination with its hardware.

It may be understood that the memory in the implementations of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By exemplary but not restrictive description, many forms of RAMs may be used, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memories in the systems and methods described herein are intended to include, but are not be limited to, these and any other suitable types of memories.

It should be understood that the above memories are described as examples rather than limitations. For example, the memory in the implementations of the present disclosure may be a static RAM (SRAM), a dynamic RAM (DRAM), a synchronous DRAM (SDRAM), a double data rate SDRAM (DDR SDRAM), an enhanced SDRAM (ES-DRAM), a synch link DRAM (SLDRAM) and a direct Rambus RAM (DR RAM), etc. That is to say, the memories in the implementations of the present disclosure are intended to include, but are not limited to, these and any other suitable types of memories.

An implementation of the present disclosure further provides a computer-readable storage medium configured to store a computer program.

Optionally, the computer readable storage medium may be applied to the first terminal in the implementations of the present disclosure, and the computer program enables a computer to perform corresponding processes implemented by the first terminal in various methods of the implementations of the present disclosure, which will not be repeated here for brevity.

Optionally, the computer readable storage medium may be applied to the target terminal in the implementations of the present disclosure, and the computer program enables a computer to perform corresponding processes implemented by the target terminal in various methods of the implementations of the present disclosure, which will not be repeated here for brevity.

An implementation of the present disclosure also provides a computer program product including computer program instructions.

Optionally, the computer program product may be applied to the first terminal in the implementations of the present disclosure, and the computer program instructions enable a computer to perform corresponding processes implemented by the first terminal in various methods of the implementations of the present disclosure, which will not be repeated here for brevity.

Optionally, the computer program product may be applied to the target terminal in the implementations of the present disclosure, and the computer program instructions enable a computer to perform corresponding processes implemented by the target terminal in various methods of the implementations of the present disclosure, which will not be repeated here for brevity.

An implementation of the present disclosure also provides a computer program.

Optionally, the computer program may be applied to the first terminal in the implementations of the present disclosure, and when the computer program is run on a computer, the computer is enabled to perform corresponding processes implemented by the first terminal in various methods of the implementations of the present disclosure, which will not be repeated here for brevity.

Optionally, the computer program may be applied to the target terminal in the implementations of the present disclosure, and when the computer program is run on a computer, the computer is enabled to perform corresponding processes implemented by the target terminal in various methods of the implementations of the present disclosure, which will not be repeated here for brevity.

Those of ordinary skills in the art will recognize that units and algorithm acts of various examples described in connection with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions for each particular application, but such implementation should not be considered to be beyond the scope of the present disclosure.

Those skilled in the art may clearly understand that for the sake of convenience and conciseness of description, the specific working processes of the systems, devices and units described above may be described with reference to the corresponding processes in the above method implementations and will not be repeated herein.

In several implementations provided by the present disclosure, it should be understood that the disclosed systems, devices and methods may be implemented in other ways. For example, the device implementations described above are only illustrative, for example, the division of the units is only a logical function division, and there may be other division manners in actual implementation. For example, multiple units or components may be combined or integrated into another system, or some features may be ignored or not executed. In addition, the shown or discussed coupling or direct coupling or communication connection between each other may be an indirect coupling or communication connection between devices or units through some interfaces, or may be in electrical, mechanical or other forms.

The unit described as a separate component may or may not be physically separated, and the component shown as a unit may or may not be a physical unit, i.e., it may be located in one place or may be distributed over multiple network units. Part or all of the units may be selected according to actual needs to achieve the purpose of the implementations.

In addition, various functional units in various implementations of the present disclosure may be integrated into one processing unit, or may exist physically separately, or two or more units may be integrated into one unit.

The functions, if implemented in a form of software functional units and sold or used as an independent product, may be stored in a computer-readable storage medium. Based on such understanding, technical solutions of the present disclosure, in essence, or a part which contributes to the prior art, or a part of the technical solutions, may be embodied in a form of a software product, the computer software product is stored in a storage medium including several instructions for enabling a computer device (which may be a personal computer, a server, or a network device, etc.) to perform all or a part of acts of the methods of various implementations of the present disclosure. The aforementioned storage medium includes various media capable of storing program codes, such as a U disk, a mobile hard disk, a read-only memory (ROM), a random access memory (RAM), a magnetic disk, or an optical disk, etc.

What are described above are merely example implementations of the present disclosure, but the protection scope of the present disclosure is not limited thereto. Any variation or substitution that may easily conceived by a person skilled in the art within the technical scope disclosed by the present disclosure shall be included within the protection scope of the present disclosure. Therefore, the protection scope of the present disclosure shall be subject to the protection scope of the claims.

The invention claimed is:

1. A method for transmitting a resource set, comprising:
    sending, by a first terminal, first information within a time range of a resource request from one or more target terminals,
        wherein the first information is used for indicating M resource sets, each resource set in the M resource sets is targeted on the one or more target terminals, and the resource set is used for determining a candidate transmission resource when a target terminal selects a resource, M is a positive integer, and M≥1.

2. The method of claim 1, wherein the first information comprises at least one of following:
    a Media Access Control Element (MAC CE) signaling carried in a Physical Sidelink Shared Channel (PSSCH), and second-stage Sidelink Control Information (SCI) carried in a PSSCH.

3. The method of claim 2, wherein the sending, by the first terminal, the first information, comprises:
    in a case that each resource set in the M resource sets is targeted on one target terminal,
    sending, by the first terminal, the first information to the one target terminal by unicast, wherein a target identity field in the second-stage SCI carried in the PSSCH is set as an identity of the one target terminal.

4. The method of claim 1, wherein the sending, by the first terminal, the first information, comprises:
    in a case that the first information is any one of a Media Access Control Element (MAC CE) signaling, and second-stage Sidelink Control Information (SCI) carried in a Physical Sidelink Shared Channel (PSSCH), M=1, and the resource set is targeted on a plurality of target terminals,
    sending, by the first terminal, the first information to the plurality of target terminals by multicast, wherein a target identity field in the second-stage SCI carried in the PSSCH is set as a group identity corresponding to the plurality of target terminals; or,
    sending, by the first terminal, the first information to the plurality of target terminals by broadcast, wherein a target identity field in the second-stage SCI carried in the PSSCH is set as an identity corresponding to broadcast, and the first information is further used for indicating identities of the plurality of target terminals.

5. The method of claim 1, wherein the sending, by the first terminal, the first information, comprises:
    in a case that the first information is any one of a Media Access Control Element (MAC CE) signaling, and second-stage Sidelink Control Information (SCI) carried in a Physical Sidelink Shared Channel (PSSCH), and a target terminal targeted by each resource set in the M resource sets is unknown to the first terminal,
    sending, by the first terminal, the first information by broadcast, wherein a target identity field in the second-stage SCI carried in the PSSCH is set as an identity corresponding to broadcast.

6. The method of claim 1, wherein the sending, by the first terminal, the first information, comprises:
    sending, by the first terminal, a physical sidelink channel carrying the first information on a target sidelink resource within a sending window, wherein the physical sidelink channel is a Physical Sidelink Shared Channel (PSSCH).

7. The method of claim 6, further comprising:
    determining, by the first terminal, the target sidelink resources through resource reselection when the first terminal does not have a reserved resource within the sending window.

8. The method of claim 7, wherein the determining, by the first terminal, the target sidelink resources through resource reselection, comprises:
    performing, by the first terminal, resource sensing; and
    determining, by the first terminal, a sensed sidelink resource as the target sidelink resource when a sidelink Reference Signal Received Power (RSRP) of the sensed sidelink resource does not exceed a first threshold, wherein the first threshold is determined according to a first priority and a priority carried in a decoded PSCCH.

9. The method of claim 8, wherein,
    the first priority is pre-configured, or the first priority is configured by a network device.

10. A terminal device, wherein the terminal device is a first terminal, and the terminal device comprises: a processor and a transceiver,
    wherein the transceiver is configured to send first information within a time range of a resource request from one or more target terminals,
    wherein the first information is used for indicating M resource sets, each resource set in the M resource sets is targeted on the one or more target terminals, and the resource set is used for determining a candidate transmission resource when a target terminal selects a resource, M is a positive integer, and M≥1.

11. The terminal device of claim 10, wherein the first information comprises at least one of following:
    a Media Access Control Element (MAC CE) signaling carried in a Physical Sidelink Shared Channel (PSSCH), and second-stage Sidelink Control Information (SCI) carried in a PSSCH.

12. The terminal device of claim 11, wherein the transceiver is specifically configured to:
    in a case that each resource set in the M resource sets is targeted on one target terminal,
    send the first information to the one target terminal by unicast, wherein a target identity field in the second-stage SCI carried in the PSSCH is set as an identity of the one target terminal.

13. The terminal device of claim 10, wherein the transceiver is specifically configured to:
    in a case that the first information is any one of a Media Access Control Element (MAC CE) signaling, and second-stage Sidelink Control Information (SCI) carried in a Physical Sidelink Shared Channel (PSSCH), M=1, and the resource set is targeted on a plurality of target terminals, send the first information to the plurality of target terminals by multicast, wherein a target identity field in the second-stage SCI carried in the PSSCH is set as a group identity of the plurality of target terminals; or, send the first information to the plurality of target terminals by broadcast, wherein a target identity field in the second-stage SCI carried in the PSSCH is set as an identity corresponding to broadcast, and the first information is further used for indicating identities of the plurality of target terminals.

14. The terminal device of claim 10, wherein the transceiver is specifically configured to:

in a case that the first information is any one of a Media Access Control Element (MAC CE) signaling, and second-stage Sidelink Control Information (SCI) carried in a Physical Sidelink Shared Channel (PSSCH), and a target terminal targeted by each resource set in the M resource sets is unknown to the first terminal, send the first information by broadcast, wherein a target identity field in the second-stage SCI carried in the PSSCH is set as an identity corresponding to broadcast.

15. The terminal device of claim 10, wherein the transceiver is specifically configured to:

send a physical sidelink channel carrying the first information on a target sidelink resource within a sending window, wherein the physical sidelink channel is a Physical Sidelink Shared Channel (PSSCH).

16. The terminal device of claim 15, wherein when the first terminal does not have a reserved resource within the sending window, the processor is configured to determine the target sidelink resource through resource reselection.

17. The terminal device of claim 16, wherein the processor is specifically configured to:

perform resource sensing;

determine a sensed sidelink resource as the target sidelink resource when a sidelink Reference Signal Received Power (RSRP) of the sensed sidelink resource does not exceed a first threshold, wherein the first threshold is determined according to a first priority and a priority carried in a decoded PSCCH.

18. The terminal device of claim 17, wherein the first priority is pre-configured, or the first priority is configured by a network device.

19. A terminal device, wherein the terminal device is a target terminal, and the terminal device comprises: a processor and a transceiver, wherein the transceiver is configured to receive first information within a time range of a resource request from one or more target terminals sent by a first terminal, wherein the first information is used for indicating M resource sets, each resource set in the M resource sets is targeted on the one or more target terminals, and the resource set is used for determining a candidate transmission resource when a target terminal selects a resource, M is a positive integer, and M≥1.

20. The terminal device of claim 19, wherein the first information comprises at least one of following:

a Media Access Control Element (MAC CE) signaling carried in a Physical Sidelink Shared Channel (PSSCH), and second-stage Sidelink Control Information (SCI) carried in a PSSCH.

* * * * *